(12) United States Patent
Fujii et al.

(10) Patent No.: US 8,567,857 B2
(45) Date of Patent: Oct. 29, 2013

(54) VEHICLE-BODY LOWER STRUCTURE OF VEHICLE

(75) Inventors: Yoshio Fujii, Hiroshima (JP); Kohei Kirita, Hiroshima (JP); Yosuke Onda, Hiroshima (JP); Hideharu Kaeriyama, Hiroshima (JP); Masafumi Sakakida, Hiroshima (JP); Kenichi Yukumatsu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 155 days.

(21) Appl. No.: 13/210,877

(22) Filed: Aug. 16, 2011

(65) Prior Publication Data

US 2012/0049501 A1    Mar. 1, 2012

(30) Foreign Application Priority Data

Aug. 25, 2010 (JP) ................. 2010-188640
May 12, 2011 (JP) ................. 2011-107223

(51) Int. Cl.
*B62D 25/20* (2006.01)
*B62D 25/02* (2006.01)

(52) U.S. Cl.
USPC .............. 296/204; 296/193.05; 296/193.07; 296/203.01

(58) Field of Classification Search
USPC .......... 296/193.05, 193.06, 193.07, 187.03, 296/187.08, 187.12, 203.001, 203.03, 204, 296/29, 203.01; 280/801.1
See application file for complete search history.

(56) References Cited

U.S. PATENT DOCUMENTS

| | | | | |
|---|---|---|---|---|
| 4,572,571 A * | 2/1986 | Malen | ....................... | 296/193.07 |
| 5,018,780 A * | 5/1991 | Yoshii et al. | ............. | 296/203.04 |
| 5,388,885 A * | 2/1995 | Warren | ..................... | 296/203.03 |
| 5,671,968 A * | 9/1997 | Masuda et al. | ........... | 296/187.12 |
| 5,820,204 A * | 10/1998 | Masuda et al. | ........... | 296/187.12 |
| 5,921,618 A * | 7/1999 | Mori et al. | ............... | 296/187.12 |
| 6,086,141 A * | 7/2000 | Masuda et al. | ............. | 296/193.1 |
| 6,129,412 A * | 10/2000 | Tanuma | ........................ | 296/204 |
| 6,416,117 B1 * | 7/2002 | Weiman | ....................... | 296/204 |
| 6,568,745 B2 * | 5/2003 | Kosuge et al. | ........... | 296/193.02 |
| 6,604,781 B2 * | 8/2003 | Uchida | ........................ | 296/204 |
| 7,195,306 B2 * | 3/2007 | Egawa et al. | ............ | 296/187.08 |
| 7,448,674 B2 * | 11/2008 | Brunner et al. | .......... | 296/193.02 |
| 7,614,683 B2 * | 11/2009 | Roccato et al. | .......... | 296/187.03 |
| 7,644,978 B2 * | 1/2010 | Tosaka et al. | ............ | 296/187.12 |
| 7,651,135 B2 * | 1/2010 | Hirotani | ........................ | 280/802 |
| 8,292,356 B2 * | 10/2012 | Ishigame et al. | ......... | 296/203.01 |
| 2012/0049501 A1 * | 3/2012 | Fujii et al. | ..................... | 280/806 |

FOREIGN PATENT DOCUMENTS

JP    2004-074835 A    3/2004
JP    2010-228482 A    10/2010

* cited by examiner

*Primary Examiner* — Glenn Dayoan
*Assistant Examiner* — Gregory Blankenship
(74) *Attorney, Agent, or Firm* — Studebaker & Brackett PC (57) ABSTRACT

A connection member which connects an outside portion of a cross member and an inside wall face portion of a side sill includes a cross-member-side connection portion connected to the cross member and a side-sill-side connection portion connected to the side sill, the side-sill-side connection portion is configured to have a lower rigidity than the cross-member-side connection portion, and an outside end portion of the cross member is located at a specified position which is located on the outside of the cross-member-side connection portion and on the inside away from the inside wall face portion of the side sill. Thereby, the impact load in the vehicle side collision can be effectively supported by the cross member with a simple structure.

3 Claims, 10 Drawing Sheets

VEHICLE-BODY LOWER STRUCTURE OF VEHICLE

BACKGROUND OF THE INVENTION

The present invention relates to a vehicle-body lower structure of a vehicle which comprises a tunnel portion provided at a central portion, in a vehicle width direction, of a floor panel forming a bottom face of a vehicle compartment and a cross member provided between the tunnel portion and a connection portion of a center pillar to a side sill provided at a side portion of the vehicle compartment to extend in the vehicle width direction.

Conventionally, as disclosed in Japanese Patent Laid-Open Publication No. 2004-74835, in the floor cross member structure of a vehicle in which the floor cross member connects the side sill, to which the lower end portion of the center pillar is connected, and the tunnel portion formed at the floor panel and extends in the vehicle width direction, the hole is formed at the ridgeline portion of the terminal portion of the cross member connected to the side sill (rocker) which is located on the outside in the vehicle width direction so that the sectional resistance force of the connection portion of the cross member to the side sill can be set to be smaller than that of the cross member body.

Further, as disclosed in Japanese Patent Laid-Open Publication No. 2010-228482, aiming at proving the vehicle-body lower structure of a vehicle which can effectively absorb compressive and bending forces, restraining the buckling deformation of the cross member, and properly restrain the upper portion of the center pillar from coming into the vehicle compartment by ensuring the proper deformation of the lower portion of the center pillar, the side-sill-side end portion of the cross member is located at a position away from the side sill with a specified distance, the connection member which connects the side-sill-side end portion of the cross member and the side face of the side sill is provided, the connection member is configured to have a lower rigidity than the cross member, and the strength of the cross-member connection area of the connection member is configured to be higher than that of the side-sill connection area of the connection member.

In case the sectional resistance force of the connection portion of the cross member to the side sill is set to be smaller than that of the cross member body as disclosed in the above-described first patent document, deformation is made occur in the vicinity of the connection portion of the floor cross member to the rocker inner portion right after the vehicle collision happens, so that the lower portion of the pillar can be made come into the vehicle compartment to restrain the upper portion of the pillar from falling in. However, in the late stage of the vehicle collision, it cannot be avoided that the upper portion of the center pillar falls into the vehicle compartment in a state in which the lower end portion of the center pillar is supported by the side sill and the cross member. Thereby, there is a problem in that the rotational moment acts on the side sill and the bending force of this rotational moment causes the bucking deformation to the cross member, so that the impact load from the vehicle side collision may not be properly supported by the cross member.

Further, since in the vehicle-body lower structure of a vehicle disclosed in the above-described second patent document, the impact load is received at the side-sill connection area with the low strength in the initial stage of impact-load input via the center pillar and the side sill and then the bending moment from the side sill is received at the cross-member connection area with the high strength, the bucking deformation of the cross member in the initial stage of vehicle side can be prevented. However, there is a problem in that the stress concentration occurs at the connection flange piece of the connection member to the cross member when the bending moment acts on the cross-member connection area and thereby this occurrence causes separation of these members, so that the impact load inputted to vehicle-body lower portion in the vehicle side collision may not be supported effectively.

SUMMARY OF THE INVENTION

The present invention has been devised in view of the above-described problems, and an object of the present invention is to provide a vehicle-body lower structure of a vehicle which can effectively support the impact load from the vehicle side collision by the cross member with a simple structure.

According to the present invention, there is provided a support structure of a vehicle-body lower structure of a vehicle, comprising a tunnel portion provided at a central portion, in a vehicle width direction, of a floor panel forming a bottom face of a vehicle compartment, a cross member provided between the tunnel portion and a connection portion of a center pillar to a side sill provided at a side portion of the vehicle compartment to extend in the vehicle width direction, and a connection member connecting an outside portion of the cross member and an inside wall face portion of the side sill, wherein the connection member includes a cross-member-side connection portion connected to the cross member and a side-sill-side connection portion connected to the side sill, the side-sill-side connection portion is configured to have a lower rigidity than the cross-member-side connection portion, and an outside end portion of the cross member is located at a specified position which is located on the outside of the cross-member-side connection portion and on the inside away from the inside wall face portion of the side sill.

According to the present invention, the connection strength of the connection member to the side sill is configured to be lower than that of the connection member to the cross member by the side-sill-side connection portion having the lower rigidity than the cross-member-side connection portion. Accordingly, in the initial stage of the vehicle side collision when the impact load is inputted in a direction of pushing the center pillar and the side sill toward the inside of the vehicle body, the side-sill-side connection portion of the connection member is crushed before the cross-member-side connection portion is, so that the impact energy can be absorbed effectively and the lower end portion of the center pillar can be moved toward the inside of the vehicle compartment. Further, the outside end portion of the cross member is located away from the inside wall face portion of the side sill, so that the outside end portion of the cross member is not connected to the inside wall face portion of the side sill. Accordingly, in the initial stage of the vehicle side collision, the lower end portion of the center pillar moves smoothly toward the inside of the vehicle compartment, so that it can be prevented effectively that the upper portion of the center pillar falls into the vehicle compartment around the lower end portion of the center pillar and the like. Also, the tolerance in manufacturing the cross member can be set to be properly great, therefore manufacturing costs can be decreased effectively.

Moreover, since the outside end portion of the cross member is located at the specified position which is located on the outside of the cross-member-side connection portion and on the inside away from the inside wall face portion of the side sill, the side sill comes to contact the outside end portion of the cross member at a specified point after the vehicle side collision. Thus, the side sill can be restrained from moving toward the inside, and also the impact load acting on the side sill can be dispersed to both the cross member and the connection member, thereby the impact load can be supported effectively. Accordingly, it can be effectively prevented that the upper portion of the center pillar falls into the vehicle compartment due to a quick increase of the impact load inputted to the center pillar in the late stage of the vehicle side collision and the improper separation is caused by the stress concentration occurring at the connection portion of the cross-member-side connection portion to the cross member due to the bending force from the rotational moment acting on the side sill accordingly, so that the impact load in the vehicle side collision can be supported stably.

According to an embodiment of the present invention, an upper face of the side sill is located above a level of an upper face of the cross member, and the side-sill-side connection portion of the connection member is located above a level of the cross-member-side connection portion. Thereby, the impact load inputted to the side sill in the vehicle side collision can be absorbed effectively by the connection member and transmitted to the cross member efficiently.

According to another embodiment of the present invention, the connection member is formed in a boxy shape having front and rear face portions connected respectively to front and rear face portions of the cross member and an upper face portion interconnecting upper end portions of the front and rear face portions of the connection member, at least one of the front and rear face portions of the connection member has an opening portion formed at the side-sill-side connection portion, the outside end portion of the cross member is located on the outside of the opening portion, and an actuator of a seatbelt device to protect a passenger seated in a seat for passenger is provided inside the connection member through the opening portion. Thereby, the actuator can be stored properly by utilizing the inside space of the boxy-shaped connection member. Accordingly, the proper layout of the actuator can be provided, without deteriorating a necessary foot space of a passenger seated in a rear-row seat.

According to another embodiment of the present invention, the connection member functions as an attachment bracket of the seat for passenger. Thereby, the number of parts can be decreased so that a light weight of the vehicle can be achieved properly, compared with a case in which the attachment bracket and the connection member are formed separately. Further, by transmitting the impact load which is inputted to the connection member from the center pillar and the side sill in the vehicle side collision or the like to the cross member via a seat rail of a seat for passenger and the like, the impact load can be supported stably.

According to another embodiment of the present invention, the cross member is arranged such that the outside end portion thereof faces the inside wall face portion of the side sill with a specified distance therebetween, and includes a cross member body extending in the vehicle width direction and a reinforcement member placed onto an outside portion of the cross member body, and the connection member is placed onto an overlap portion of the cross member body and the reinforcement member. Thereby, the impact energy transmitted to the connection member via the center pillar and the side sill in the vehicle side collision or the like can be supported properly at the overlap portion of the reinforcement member and the cross member body and thereby absorbed effectively, without providing any means, such as making the cross member rather thick over its entire length.

According to another embodiment of the present invention, the cross member includes an outside member which is connected to the side sill at an inside end portion thereof via the connection member and an inside member which is provided on the inside of the outside member, and the outside member of the cross member has a higher rigidity than the inside member. Thereby, the impact energy transmitted to the connection member via the center pillar and the side sill in the vehicle side collision or the like can be supported properly at the outside member and thereby absorbed effectively, achieving a light weight of the vehicle body by making the inside member or the like.

According to another embodiment of the present invention, the side-sill-side connection portion of the connection member is not connected to the cross member so that the side-sill-side connection portion has the lower rigidity than the cross-member-side connection portion. Thereby, it can be prevented effectively with a simple structure that the buckling deformation of the cross member occurs or the separation of the connection portion of the connection member to the cross member occurs in the vehicle side collision, so that the impact load in the vehicle side collision can be supported by the cross member more stably.

According to another embodiment of the present invention, the cross-member-side connection portion of the connection member is formed in a closed-cross-section structure and the side-sill-side connection portion of the connection member is formed in an open-cross-section structure so that the side-sill-side connection portion has the lower rigidity than the cross-member-side connection portion. Thereby, it can be prevented more effectively with the simple structure that the buckling deformation of the cross member occurs or the separation of the connection portion of the connection member to the cross member occurs in the vehicle side collision, so that the impact load in the vehicle side collision can be supported stably.

Other features, aspects, and advantages of the present invention will become apparent from the following description which refers to the accompanying drawings.

DETAILED DESCRIPTION OF THE INVENTION

Hereinafter, preferred embodiments of the present invention will be descried referring to the accompanying drawings.

Figure 1:
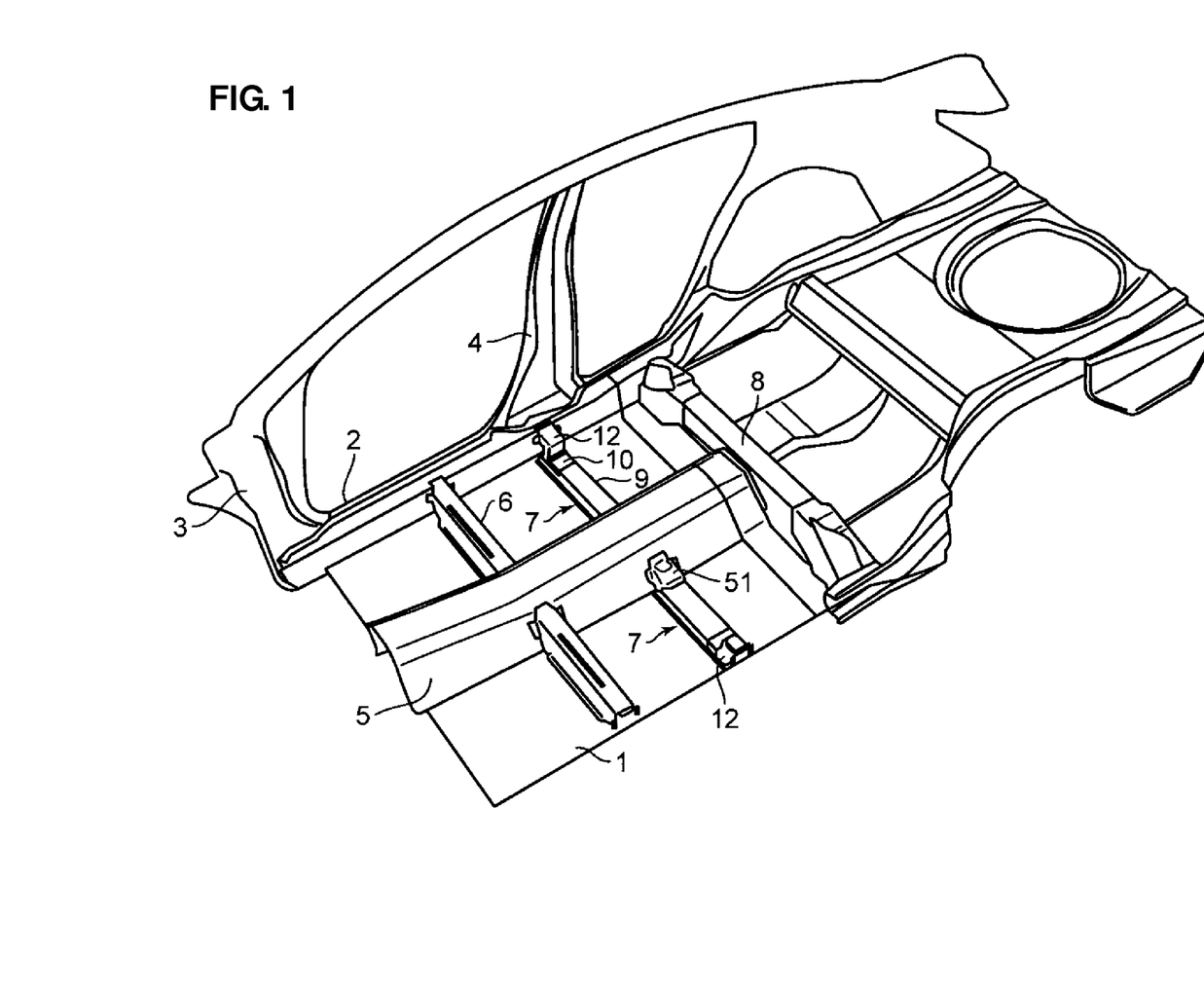
FIG. 1 is a perspective view showing a schematic structure of a vehicle body equipped with a vehicle-body lower structure according to an embodiment of the present invention.

FIG. 1 shows an embodiment of a vehicle-body lower structure of a vehicle according to the present invention. The vehicle-body structure comprises a floor panel 1 which forms a bottom face of a vehicle compartment and a side sill 2 which extends in a vehicle longitudinal direction at a side portion of the vehicle compartment. A front pillar 3 rises to extend upward and rearward from a front end portion of the side sill 2, and a center pillar 4 rises to extend upward from a middle portion, in the vehicle longitudinal direction, of the side sill 2. Further, a tunnel portion 5 is provided at a central portion, in a vehicle width direction, of the floor panel 1 to project toward the inside of the vehicle compartment (upward) and extend in the vehicle longitudinal direction.

A so-called No. 2 cross member 6 is provided between the tunnel portion 5 formed at the floor panel 1 and the side sill 2 to extend in the vehicle width direction. Further, a so-called No. 2.5 cross member 7 (hereafter, referred to as a cross member 7, simply) is provided between the tunnel portion 5 and a connection portion of the center pillar 4, to the side sill 2 to which a lower end portion of the center pillar 4 is connected, to extend in the vehicle width direction in back of the No. 2 cross member 6. Moreover, a so-called No. 3 cross member 8 is provided between respective rear end portions of the both side sills 2 to extend in the vehicle width direction.

Figure 2:
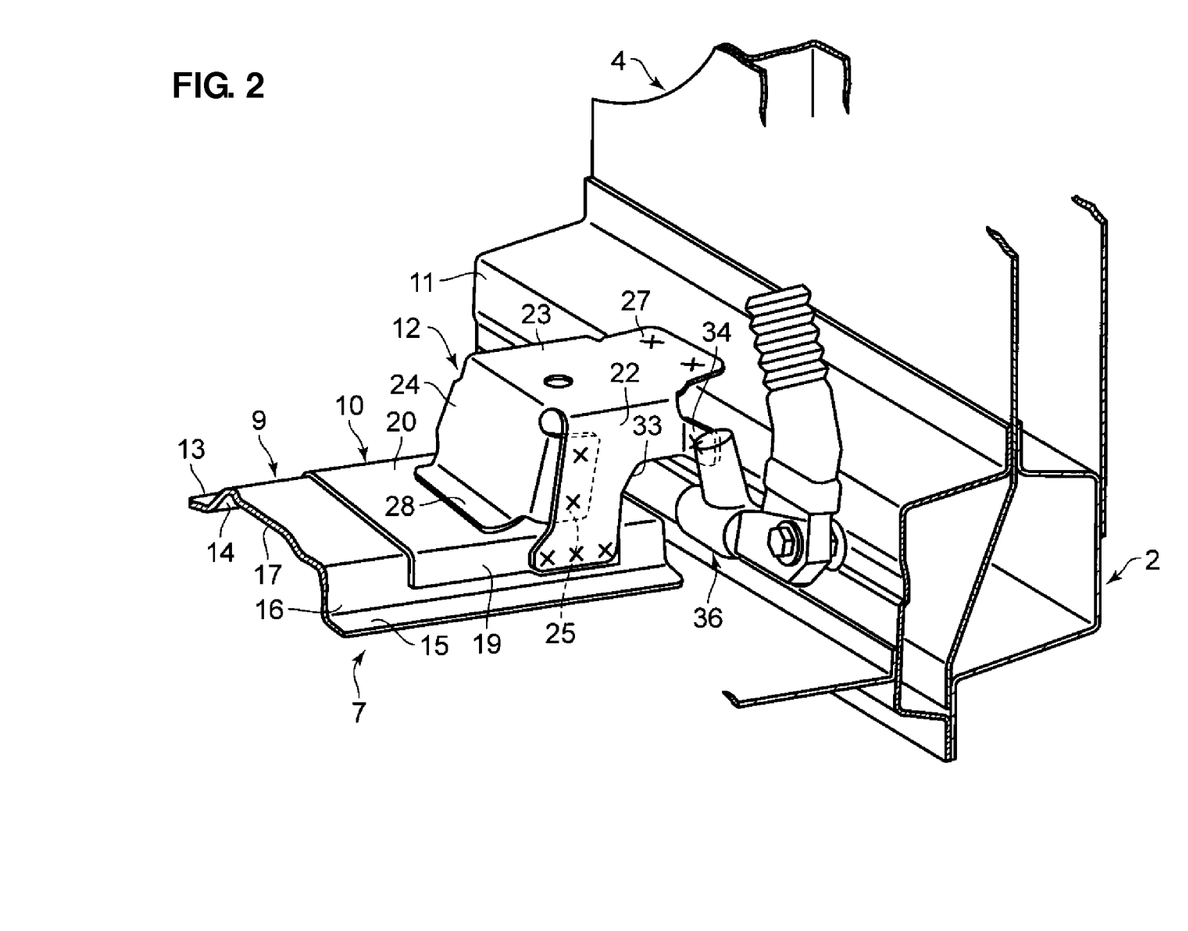
FIG. 2 is a perspective view showing a structure of a connection portion of a cross member and a side sill.
Figure 3:
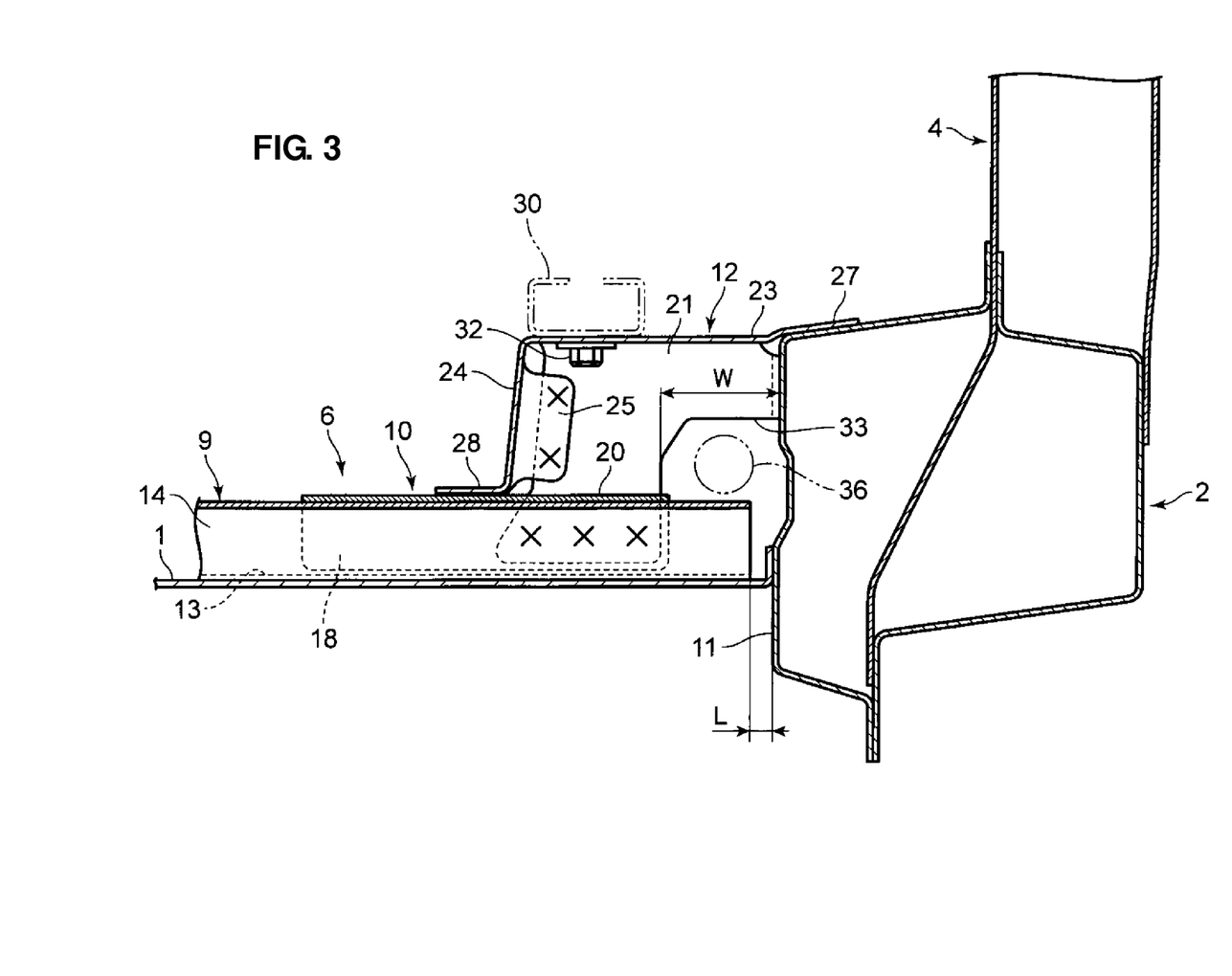
FIG. 3 is a sectional view showing the structure of the connection portion of the cross member and the side sill.
Figure 4:
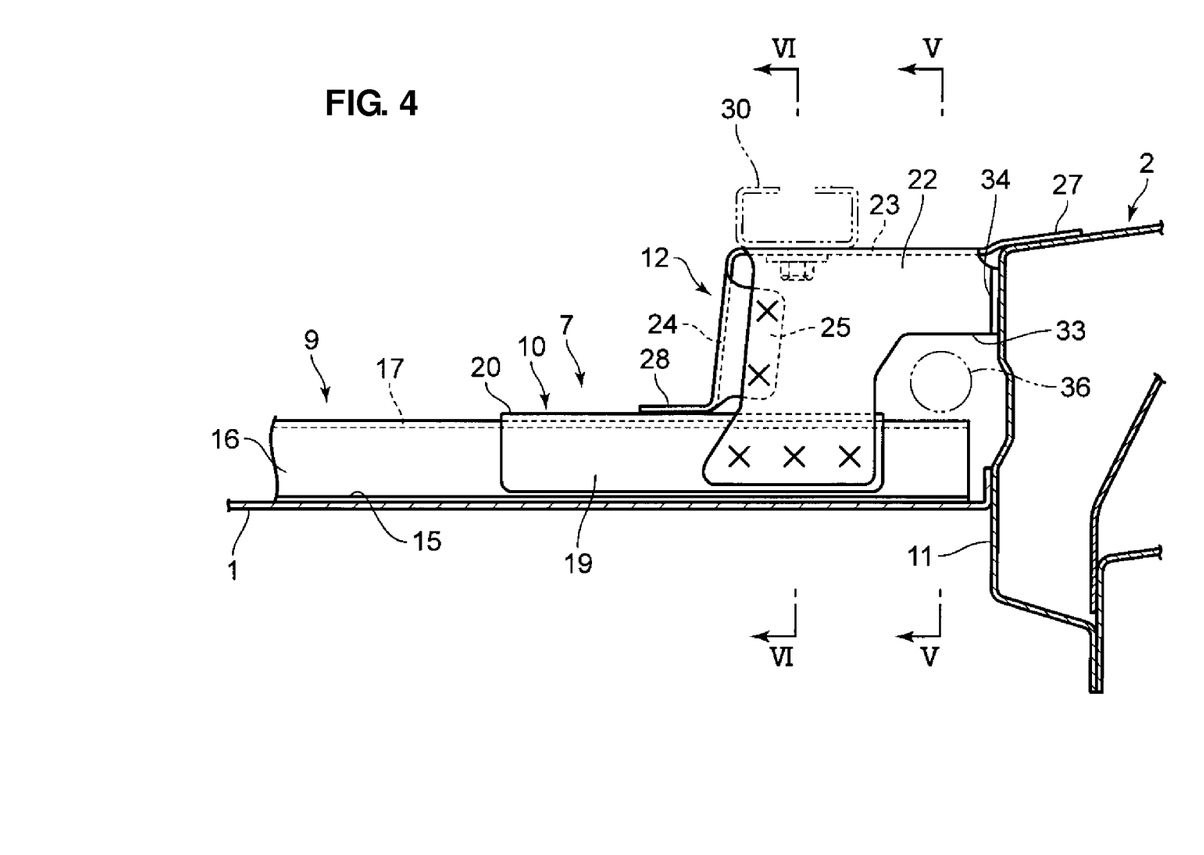
FIG. 4 is a sectional view of the structure of the connection portion of the cross member and the side sill, when viewed from back.

The cross member 7 comprises, as shown in FIGS. 2-4, a cross member body 9 which is provided between the connection portion of the center pillar 4 to the side sill 2 to extend in the vehicle width direction and a reinforcement member 10 which is placed onto an outside portion thereof (a portion thereof on the side of the side sill 2). An outside end portion of the cross member body 9 is located at a specified position which is located on the outside of a notch portion 33 formed at a connection member 12 (which will be described below) and on the inside away from an inside wall face portion 11 of the side sill 2 with a specified distance L. Thus, it is configured such that an outside end portion of the cross member 7 is not connected to the inside wall face portion 11 of the side sill 2. Further, the connection member 12 which connects an outside end portion of the cross member 7 and the inner wall face portion 11 of the side sill 2 is placed onto an overlap portion of the cross member body 9 and the reinforcement member 10.

The cross member body 9 includes a front face portion 14 which is fixed to an upper face of the floor panel 1 via its lower-end connection flange 13 by spot welding or the like, a rear face portion 16 which is fixed to the upper face of the floor panel 1 via its lower-end connection flange 15 by spot welding or the like, and an upper face portion 17 which interconnects respective upper end portions of the front and rear face portions 14, 16, and is formed to have a U-shaped cross section. The reinforcement member 10 includes front and rear face portions 18, 19 which are overlapped onto the front and rear face portions 14, 16 of the cross member body 9 and fixed to these portions 14, 16 by spot welding or the like and an upper face portion 20 which is overlapped onto the upper face portion 17 of the cross member body 9 and fixed to this face portion 20 by spot welding or the like, and is formed to have a U-shaped cross section.

An X mark in FIGS. 2-4 shows a spot welding point where the connection member 12 and the cross member body 9 or the side sill 2 are connected. Herein, any other known connecting means than the spot welding, such as ark welding, lazar welding, plasma welding, frictional agitation welding, or connection with rivets or bolts, are applicable as means for connecting the connection member 12 and the cross member body 9 or the side sill 2.

The connection member 12 is formed in a boxy shape which has front and rear face portions which are connected respectively to front and rear face portions of the cross member 7, specifically, front and rear face portions 21, 22 connected to the front and rear face portions 18, 19 of the reinforcement member 10 by spot welding or the like via their lower end portions, an upper face portion 23 which interconnects respective upper end portions of the front and rear face portions 21, 22, and an inner face portion 24 which is provided to cover inner-face portions of these face portions 21, 22 and 23. In the present embodiment, a sheet of steel plate is bent to form the above-described face portions 21-24, and a pair of flanges 25 which is formed at the inner face portion 24 is connected to the above-described front and rear face portions 21, 22 by spot welding or the like, so that the boxy-shaped connection member 12 is formed.

The upper face portion 23 of the connection member 12 is arranged above and away from the upper face portions 17, 20 of the cross member body 9 and the reinforcement member 10 with a specified distance, so that it is located substantially at the same level as an upper wall face 26 of the side sill 2. A connection flange 27 which is fixed to the upper wall face 26 of the side sill 2 by spot welding or the like is formed at an outside end portion of the upper face portion 23. Further, at the inner face portion 24 of the connection member 12 is formed a connection flange 28 which is fixed to the upper face portion 20 of the reinforcement member 10 by spot welding or the like on the overlap portion of the cross member body 9 and the reinforcement member 10.

Further, a nut member 32 for fixing a rear end portion of a seat rail 30 supporting a seat cushion (not illustrated) of a seat for passenger S, which is comprised of a front-row seat including a driver's seat, an assistant's seat or the like, by attachment bolts, not illustrated, is provided at a lower face of the upper face portion 23 of the connection member 12. Thus, the connection member 12 functions as an attachment bracket of the seat for passenger S.

The notch portions 33 are formed at lower part of the side-sill-side connection portions of the front and rear face portions 21, 22 of the connection member 12 in the present embodiment. At respective outside end portions of the front and rear face portions 21, 22 are formed connection flanges 34 which are fixed to the inner wall face portions 11 of the side sill 2 by spot welding or the like. The size of this notch portion 33 is large enough to pass an actuator 36 of a seatbelt device 35 for protection of the passenger seated in the seat for passenger S described below through this notch portion 33.

The above-described connection member 12 includes a cross-member-side connection portion which is located on the inside of an arrangement portion of the notch portions 33 and a side-sill-side connection portion which corresponds to the arrangement portion of the notch portions 33. The side-sill-side connection portion is connected to the upper face and the inner wall face portion 11 of the side sill 2 at its outside end portions by spot welding. Further, the cross-member-side connection portion is fixed to the upper face portion 20 and the front and rear face portions 18, 19 of the reinforcement member 10 at its lower end portions by spot welding.

Figure 5:
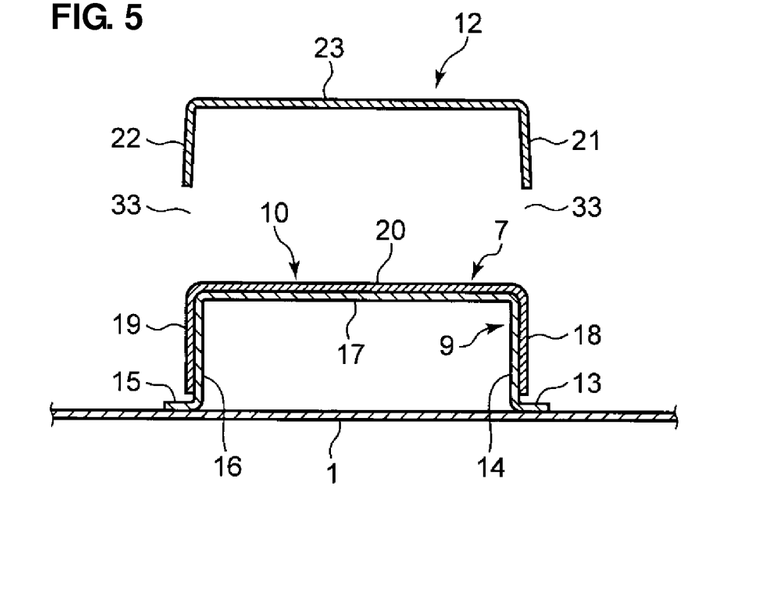
FIG. 5 is a sectional view taken along line V-V of FIG. 4.
Figure 6:
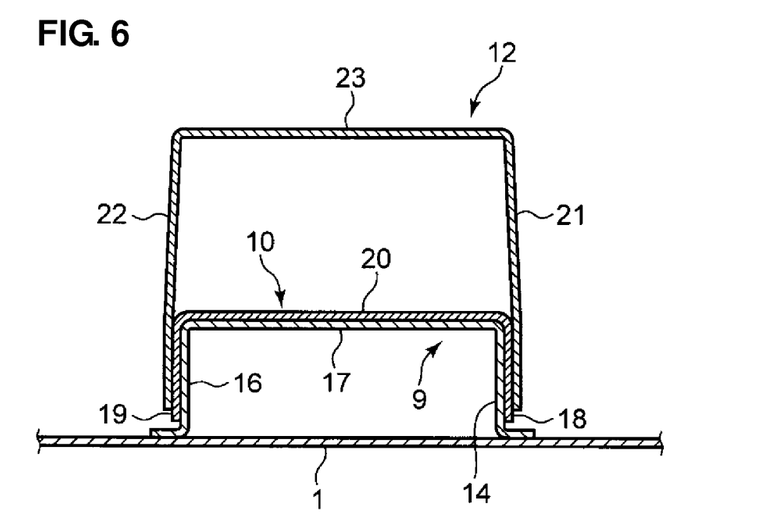
FIG. 6 is a sectional view taken along line VI-VI of FIG. 4.

The notch 33 is formed at the side-sill-side connection portion of the connection member 12 as shown in FIG. 5, so that the section modulus of the side-sill-side connection portion is smaller than that of the cross-member-side connection portion with no notch portion shown in FIG. 6. Thereby, the side-sill-side connection portion has the smaller rigidity than the cross-member-side connection portion. Further, since the lower end portion of the side-sill-side connection portion of the connection member 12 is not connected to the side sill 2, the side-sill-side connection portion has the smaller rigidity than the cross-member-side connection portion to the cross member 7.

The width W of the above-described notch portion 33 is set to be greater than the distance L between the outside end portion of the cross member body 9 and the inner wall portion 11 of the side sill 2, so that the outside end portion of the cross member body 9 is located on the outside of the inside end portion of the notch portion 33, i.e., the cross-member-side connection portion.

Figure 7:
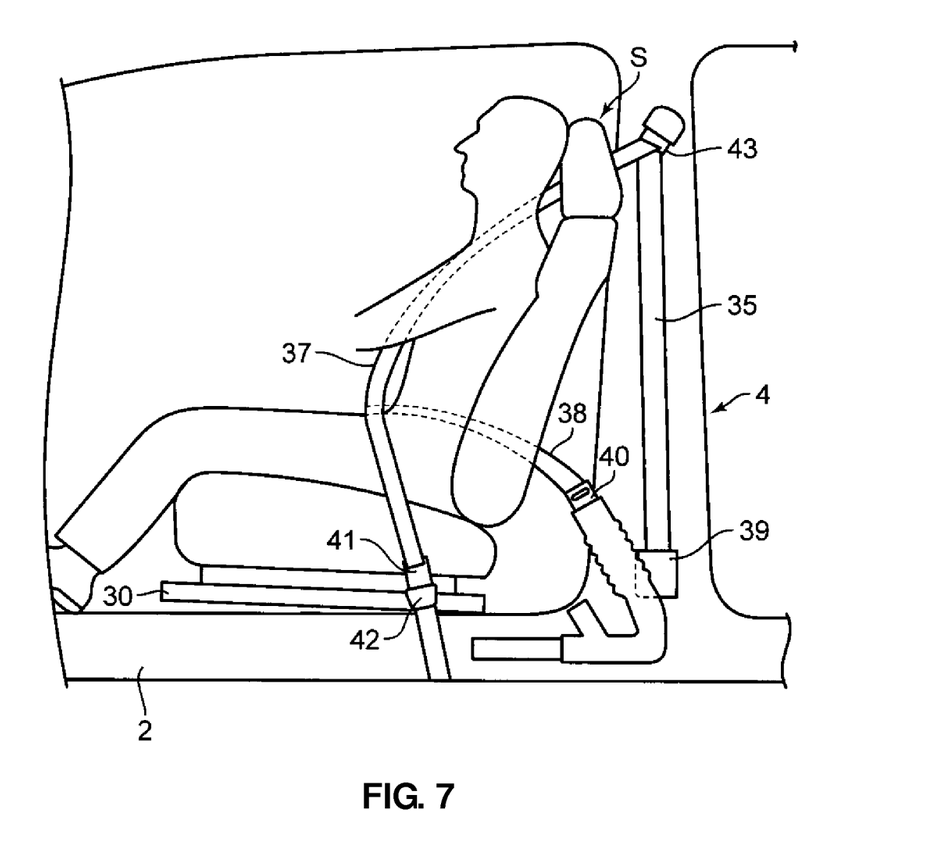
FIG. 7 is a side view showing a specific structure of a seatbelt device.
Figure 8:
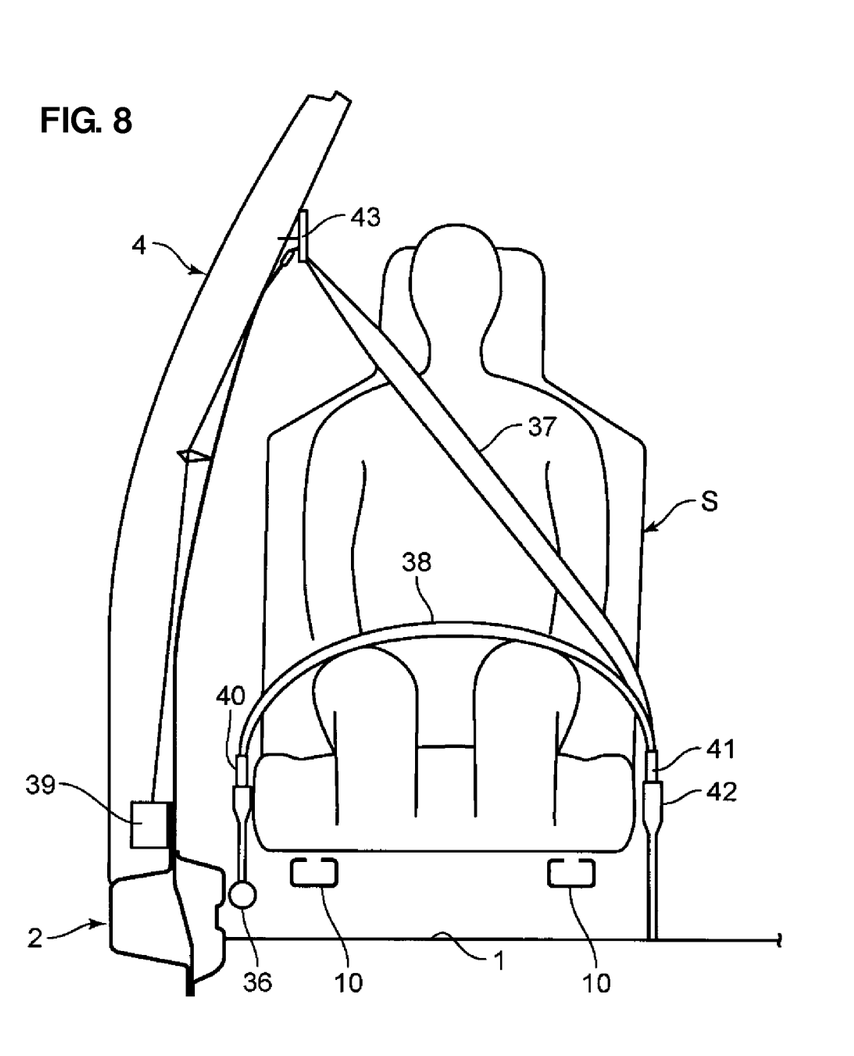
FIG. 8 is an elevational view showing the specific structure of the seatbelt device.
Figure 9:
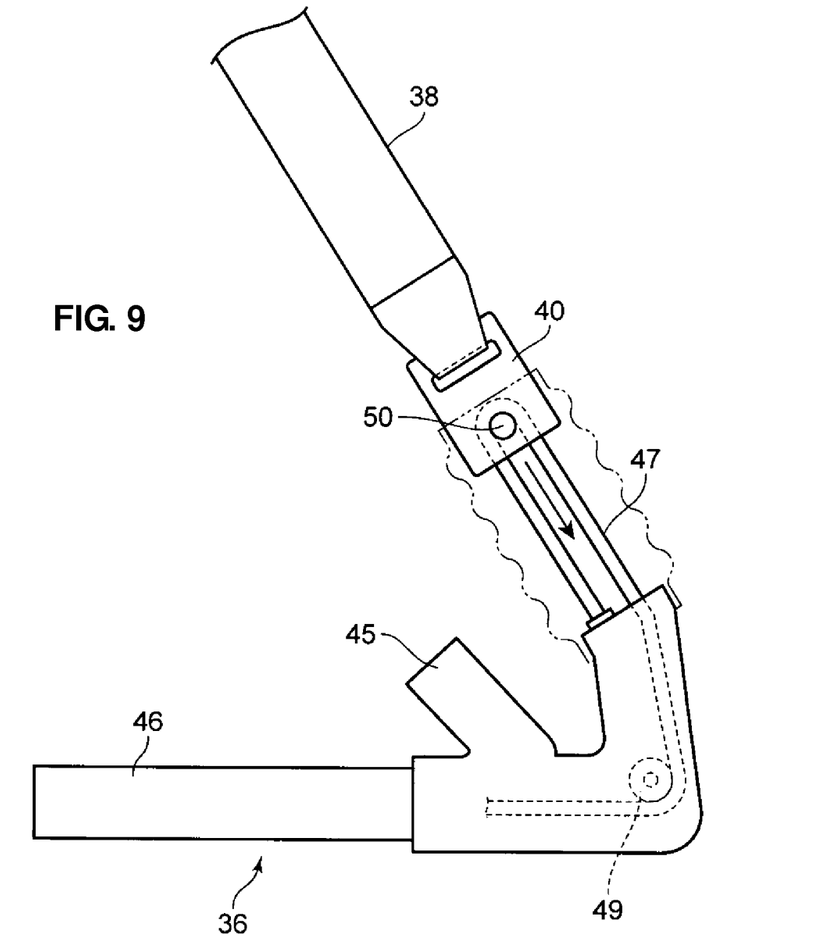
FIG. 9 is a side view showing a specific structure of an actuator of the seatbelt device.

The seatbelt device 35, as shown in FIGS. 7-9, is a three-point type of seatbelt mechanism which comprises a shoulder belt 37 which extends obliquely from a shoulder portion to a waist portion of the passenger, a lap belt 38 which extends over the passenger's waist portion in the vehicle width direction, a retractor 39 which is provided at a lower portion of the center pillar 4 and supports a lower end portion of the shoulder belt 37 so as to wind it up, a lap anchor 40 which fixes a tip of the lap belt 38 to the vehicle body, a tongue 41 which is provided to slide along the shoulder belt 37 and the lap belt 38, and a buckle 42 which engages with the tongue 41 detachably.

The retractor 39 includes a winding mechanism to wind up the lower end portion of the shoulder belt 37 and a load limiter to restrict the shoulder belt from being quickly withdrawn from the retractor 39. The load limiter releases a lock state of a winding reel of the retractor 39 when a tension force acting on the shoulder belt 37 becomes a specified value or greater, so that the shoulder belt 37 is allowed to be withdrawn from the retractor 39. Thereby, the function of releasing a restraint force of the passenger can be provided.

Further, the shoulder belt 37 which has been withdrawn upward from the retractor 39 is supported at a shoulder anchor 43 which is provided at the upper portion of the center pillar 4 so as to allow it to pass therethrough. And, the lap anchor 40 engaging with the tip of the lap belt 38 is supported at an outside side portion of the passenger's seat S by the actuator 36 with a pre-tension mechanism which is arranged on the floor panel 1.

The actuator 36, as shown in FIG. 9, comprises an inflator 45 which generates combustion gas receiving a control signal outputted from a control unit, not illustrated, a cylinder 46 which accepts the combustion gas from the inflator 45 therein, a piston (not illustrated) provided inside a cylinder 46, and a wire member 47 which is connected to the piston at its lower end portion. The wire member 47 is wound up by a pulley 49 which is rotationally supported at a casing 48, and an upward extension portion of the wire member 47 is supported by a pin 50. The cylinder 46 and the like of the actuator 36 are arranged inside the connection member 12 through the notch portion 33, and supported by a bracket and the like, not illustrated, in a state of extending along the inner wall portion 11 of the side sill 2.

Herein, when the vehicle collision occurs, a powder stored inside the inflator 45 is ignited and combusted to drive the piston in the cylinder 46 with its gas pressure, so that the lap anchor 40 is lowered by the wire member 47. Thus, the specified tension force is applied to the lap belt 38 in the vehicle collision so that the lap belt 38 and the shoulder belt 37 can be pressed against the passenger. Accordingly, the passenger can be effectively protected in a state in which the passenger is properly seated in the seat S with the seat cushion and the seat back.

Figure 10:
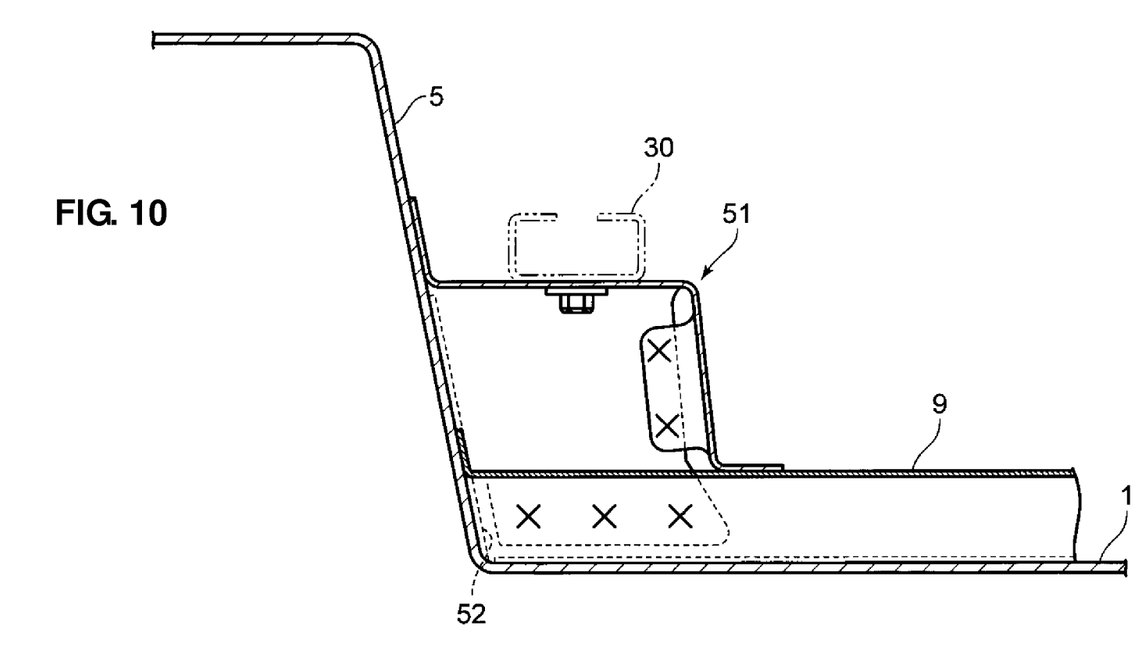
FIG. 10 is a sectional view showing a structure of a connection portion of the cross member and a tunnel portion.

Further, an inside portion (a portion on the side of the tunnel portion 5) of the cross member body 9 is connected to a side wall portion of the tunnel portion 5 via a connection member 51 as shown in FIG. 10. Moreover, a rear end portion of the seat rail 30 is fixed onto the connection member 51 via an attachment bolt, not illustrated, so that the connection member 51 functions also as the attachment bracket of the seat for passenger S. Herein, the connection member 51 is configured to be substantially similar to the above-described connection member except what this member 51 has no need to have the above-described notch portion 33 and the following points.

There is necessarily no need to arrange the above-described reinforcement member at the inside portion of the cross member body 9, and therefore the reinforcement member may be omitted. Further, the inside end portion of the cross member body 9 is fixed to the side wall face of the tunnel portion 5 at its connection flange 52 which projects from the inside end portion of the cross member body 9 by spot welding or the like.

As described above, the support structure of a vehicle-body lower structure of a vehicle comprises the tunnel portion 5 provided at the central portion, in the vehicle width direction, of the floor panel 1 forming the bottom face of the vehicle compartment, the cross member 7 provided between the tunnel portion 5 and the connection portion of the center pillar 4 to the side sill 2 provided at the side portion of the vehicle compartment to extend in the vehicle width direction, and the connection member 12 connecting the outside portion of the cross member 7 and an inside wall face portion 11 of the side sill 2, wherein the connection member 12 includes the cross-member-side connection portion connected to the cross member body 9 and the side-sill-side connection portion connected to the side sill 2, the side-sill-side connection portion is configured to have the lower rigidity than the cross-member-side connection portion, and the outside end portion of the cross member 7 is located at the specified position which is located on the outside of the cross-member-side connection portion and on the inside away from the inside wall face portion of the side sill 2. Accordingly, it can be effectively prevented that the buckling deformation of the cross member 7 occurs or the separation of the connection portion of the connection member 12 to the cross member 7 occurs in the vehicle side collision, so that the impact load in the vehicle side collision can be supported by the cross member 7 stably.

That is, since the notch portions 33 are formed at the lower portion of the side-sill-side connection portion of the front and rear face portions 14, 16 of the boxy-shaped connection member 12 in the above-described embodiment, the side-sill-side connection portion is configured to be lower than that of the cross-member-side connection portion of the connection member. Accordingly, in the initial stage of the vehicle side collision or the like when the impact load is inputted in the direction of pushing the center pillar 4 and the side sill 2 toward the inside of the vehicle body, the side-sill-side connection portion of the connection member 12 is crushed before the cross-member-side connection portion is, so that the impact energy can be absorbed effectively and the lower end portion of the center pillar 4 can be moved toward the inside of the vehicle compartment.

Further, the outside end portion of the cross member body 9 is located away from the inside wall face portion 11 of the side sill 2 with the specified distance L, so that the outside end portion of the cross member 7 is not connected to the inside wall face portion 11 of the side sill 2. Accordingly, in the initial stage of the vehicle side collision, the lower end portion of the center pillar 4 moves smoothly toward the inside of the vehicle compartment, so that it can be prevented effectively that the upper portion of the center pillar 4 falls into the vehicle compartment around the lower end portion of the center pillar 4.

Moreover, the outside end portion of the cross member 7 is located on the outside of the notch portion 33 formed at the connection member 12, so that the outside end portion of the cross member 7 is located at the specified position which is located on the outside of the cross-member-side connection portion and on the inside away from the inside wall face portion of the side sill 2 with the specified distance L. Accordingly, the side sill 2 comes to contact the outside end portion of the cross member 7 at a specified point after the vehicle side collision. Thus, the side sill 2 can be restrained from moving toward the inside, and also the impact load acting on the side sill 2 can be dispersed to both the cross member 7 and the connection member 12, thereby the impact load can be supported more effectively. Accordingly, it can be effectively prevented that the upper portion of the center pillar 4 falls into the vehicle compartment due to a quick increase of the impact load inputted to the center pillar 4 in the late stage of the vehicle side collision and the improper separation is caused by the stress concentration occurring at the connection portion of the cross member 12 to the cross member 7 due to the bending force from the rotational moment acting on the side sill 2 accordingly, so that the impact load in the vehicle side collision can be supported stably.

Also, since the outside end portion of the cross member 7 is located on the inside away from the inside wall face portion of the side sill 2 with the specified distance L, the tolerance in manufacturing the cross member 7 can be set to be properly great, compared to a case in which the outside end portion of the cross member 7 is connected to the inner wall portion of the side sill 2. Therefore, manufacturing costs can be decreased effectively.

Further, since the upper face of the side sill 2 is located above the level of the upper face of the cross member 7 and the side-sill-side connection portion of the boxy-shaped connection member 12 is located above the level of the cross-member-side connection portion in the vehicle-body lower structure of a vehicle according to the above-described embodiment, the impact load inputted to the side sill 2 in the vehicle side collision can be supported effectively at the connection member 12 and transmitted to the cross member 7 efficiently even in the case of the level positions of the side sill 2 and the cross member 7 being different from each other. Herein, in case the level positions of the side sill 2 and the cross member 7 are almost the same, the side-sill-side connection portion may be configured to have the lower rigidity than the cross-member-side connection portion by forming the connection member in a plate shape with an opening portion formed at the side-sill-side connection portion of this connection member.

Moreover, according to the above-described embodiment, the connection member 12 is formed in the boxy shape having the front and rear face portions 21, 22 which are connected respectively to the front and rear face portions of the cross member 7 and the upper face portion 23 which interconnects the upper end portions of these upper face portions 21, 22, at least one of the front and rear face portions 21, 22 of the connection member 12 has the notch portion 33 formed at the side-sill-side connection portion, the outside end portion of the cross member 7 is located on the outside of the notch portion 33, and the actuator 36 of the seatbelt device 35 to protect the passenger seated in the seat for passenger S is provided inside the connection member 12 through the notch portion 33. Thereby, the actuator 36 can be stored properly by utilizing the inside space of the boxy-shaped connection member 12. Accordingly, the proper layout of the actuator 36 can be provided, without deteriorating a foot space of a passenger seated in the rear-row seat.

In particular, in case it is configured such that the connection member 12 which connects the outside portion of the cross member 7 and the inner wall face portion 11 of the side sill 2 functions as the attachment bracket of the seat for passenger S like the above-described embodiment, the number of parts can be decreased so that a light weight of the vehicle can be achieved properly, compared with a case in which the attachment bracket and the connection member 12 are formed separately. Further, by transmitting the impact load inputted to the connection member 12 from the center pillar 4 and the side sill 2 in the vehicle side collision or the like to the No. 2 cross member 6 via the seat rail 30 of the seat for passenger S and the like, for example, the impact load can be supported stably.

Also, the cross member 7 is arranged such that the outside end portion thereof faces the inside wall face portion 11 of the side sill 2 with the specified distance L, and includes the cross member body 9 extending in the vehicle width direction and the reinforcement member 10 placed onto the outside portion of the cross member body 9, and the connection member 12 is placed onto the overlap portion of the cross member body 9 and the reinforcement member 10 in the above-described embodiment. Thereby, the impact energy transmitted to the connection member 12 via the center pillar 4 and the side sill 2 in the vehicle side collision or the like can be supported properly at the overlap portion of the reinforcement member 10 and the cross member body 9 and thereby absorbed effectively, without providing any means, such as making the cross member body 9 rather thick over its entire length.

Figure 11:
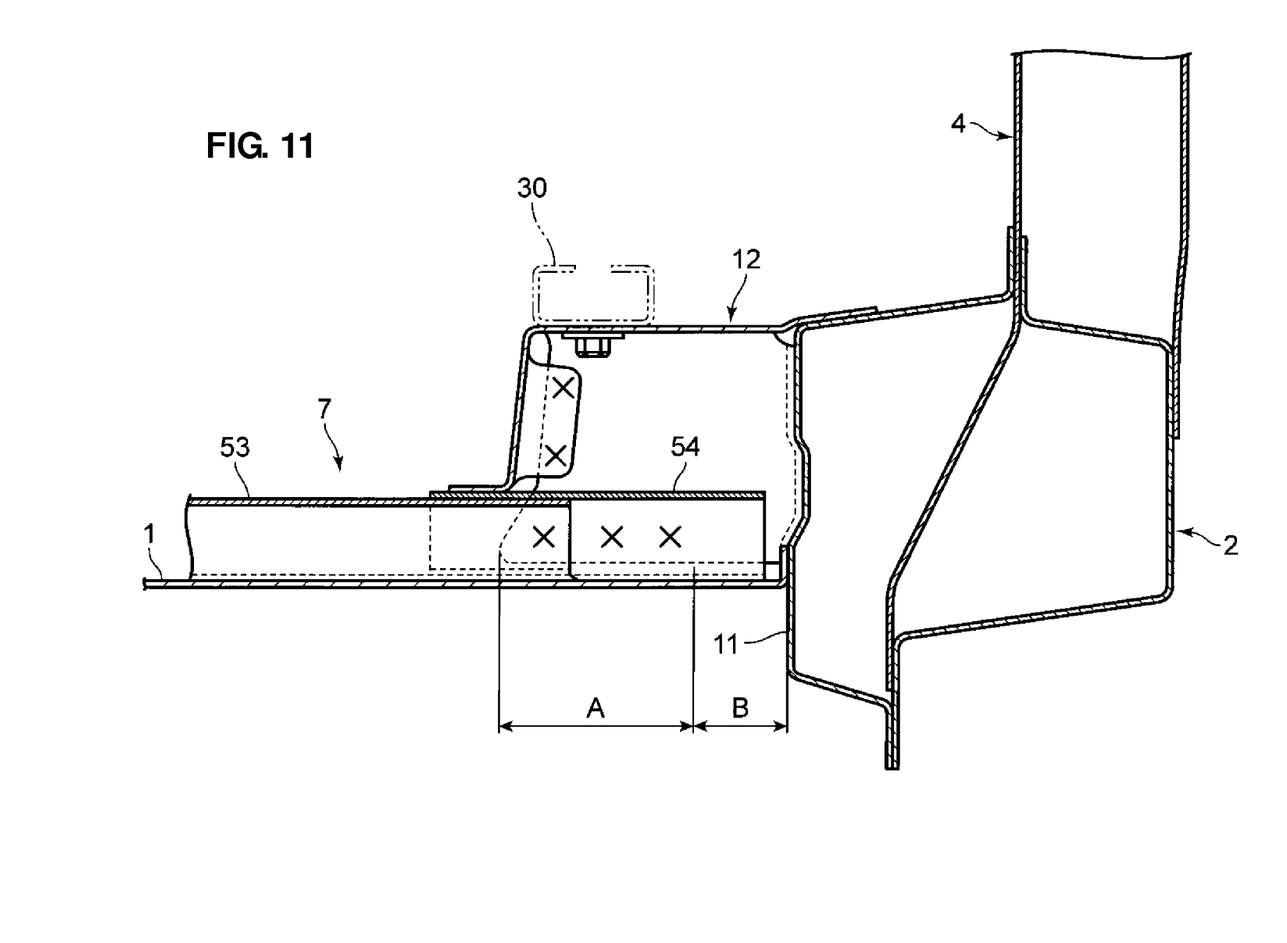
FIG. 11 is a side view showing another embodiment of the vehicle-body lower structure according to the present invention, which corresponds to FIG. 3.

Herein, in place of the above-described embodiment in which the cross member 7 is comprised of the cross member body 9 and the reinforcement member 10, the cross member 7 may be comprised of an outside member 54, an outside end portion of which is connected to the inner wall face portion 11 of the side sill 2 via the connection member 12, and an inside member 53, an inside end portion of which is connected to the side wall portion of the tunnel portion (not illustrated) via the connection member 51 as shown in FIG. 11. Herein, the outside member 54 of the cross member 7 may be configured to have a higher strength than the inside member 53 by making the thickness of the outside member 54 thicker than that of the inside member 53, or making the outside member 54 of a high-tension steel for the inside member 53 made of a normal steel plate.

In this case, since the fixing portion of the cross-member-side portion of the connection member 12 can be ensured properly, achieving the light weight of the vehicle body by thickness of the inside member 53 properly thin or the like, the impact energy transmitted to the connection member 12 via the center pillar 4 and the side sill 2 in the vehicle side collision or the like can be supported properly by the cross member 7 and thereby absorbed effectively.

Herein, while the above-described embodiment shows an example in which the notch portions 33 are formed both at the front and rear face portions 21, 22 of the connection member 12, the notch portion 33 may be formed only one of the face portions 21, 22. For example, in case the length of the actuator 36 is so short that its front portion does not project forward beyond the front face portion 21 of the connection member 12, the front face portion 22 may not have the notch portion 33 formed thereat. Also, an opening portion, such as a through hole, may be formed, instead of the notch portions 33 formed at the front and rear face portions 21, 22 of the connection member 12, so that the cross-member-side connection portion of the connection member 12 has a lower rigidity than the side-sill-side connection portion of the connection member 12.

Further, in place of the above-described embodiment in which the actuator 36 with the pre-tension mechanism to restrain the passenger by pressing webbings of the shoulder belt 37 and the lap belt 38 against the passenger in a vehicle frontal collision or the like is arranged inside the connection member 12 through the notch portion 33, an actuator of an air-belt mechanism to supply air to inflate airbags provided at the shoulder belt 37 and the lap belt 38 may be provided inside the connection member 12 through the notch portion 33.

The above-described air-belt mechanism comprises an air pipe which connects to the airbags of the shoulder belt 37 and the lap belt 38 and the actuator which is comprised of an inflator of supplying combustion gas into the airbags via the air pipe to inflate the airbags. When the an impact load is inputted from the vehicle side portion, this actuator is operated to inflate the airbags in accordance with an operation demand signal which is outputted from a seatbelt control means, not illustrated, so that the shoulder belt 37 and the lap belt 38 are pressed against the passenger with a pressure of the airbags. In this constitution, the actuator of the air-belt mechanism is stored by properly utilizing the inside space of the boxy-type connection member 12, so that the proper layout of the actuator can be provided, without deteriorating a necessary foot space of the passenger seated in the rear-row seat and the like.

Also, as shown in FIG. 11, a side-sill-side connection portion B located on the outside of the connection member 12 may be configured to have the smaller rigidity than a cross-member-side connection portion A located on the inside of the connection member 12 through an arrangement in which the cross-member-side connection portion A is fixed to the cross member 7 by spot welding or the like, whereas the side-sill-side connection portion B is just overlapped onto the cross member 7, not connected to the cross member 7. In this case, it can be prevented effectively with a simple structure that the buckling deformation of the cross member 7 occurs or the separation of the connection portion of the connection member 12 to the cross member 7 occurs in the vehicle side collision, so that the impact load in the vehicle side collision can be supported by the cross member 7 more stably.

That is, since the outside end portion of the cross member 7 is located at the specified position which is located on the outside of the cross-member-side connection portion A, the side sill 2 comes to contact the outside end portion of the cross member 7 at a specified point after the vehicle side collision when the moving amount of the side sill 2 toward the inside of the vehicle compartment is equal to the above-described specified distance L. Thus, the side sill 2 can be restrained from moving toward the inside, and also the impact load acting on the side sill 2 can be dispersed to both the cross member 7 and the connection member 12, thereby the impact load can be supported effectively. Accordingly, it can be effectively prevented that the upper portion of the center pillar 4 falls into the vehicle compartment due to the quick increase of the impact load inputted to the center pillar 4 in the late stage of the vehicle side collision and the improper separation is caused by the stress concentration occurring at the connection portion of the connection member 12 to the cross member 7 due to the bending force from the rotational moment acting on the side sill 2 accordingly, so that the impact load in the vehicle side collision can be supported stably.

Moreover, in the vehicle-body lower structure of a vehicle in which the upper face of the side sill 2 is located above the level of the upper face of the cross member 7 as shown in FIG. 11, the cross-member-side connection portion A of the boxy-shaped connection member 12 is formed in a closed-cross-section structure through being connected to the cross member 7 and the side-sill-side connection portion B is formed in an open-cross-section structure through not being connected to the cross member so that the side-sill-side connection portion B has the lower rigidity than the cross-member-side connection portion A. Thereby, it can be prevented more effectively with the simple structure that the buckling deformation of the cross member 7 occurs or the separation of the connection portion of the connection member 12 to the cross member 7 occurs in the vehicle side collision, so that the impact load in the vehicle side collision can be supported more stably at the cross member 7.

The present invention should not be limited to the above-described embodiments, and any other modifications and improvements may be applied within the scope of a sprit of the present invention.

What is claimed is:

1. A vehicle-body lower structure of a vehicle, comprising:
a tunnel portion provided at a central portion, in a vehicle width direction, of a floor panel forming a bottom face of a vehicle compartment;
a cross member provided between the tunnel portion and a connection portion of a center pillar to a side sill provided at a side portion of the vehicle compartment to extend in the vehicle width direction; and
a connection member connecting an outside portion of the cross member and an inside wall face portion of the side sill,
wherein said connection member includes a cross-member-side connection portion connected to said cross member and a side-sill-side connection portion connected to said side sill, said side-sill-side connection portion is configured to have a lower rigidity than said cross-member-side connection portion, and an outside end portion of said cross member is located at a specified position which is located on the outside of the cross-member-side connection portion and on the inside away from the inside wall face portion of the side sill; and
said connection member is formed in a box shape having front and rear face portions connected respectively to front and rear face portions of said cross member and an upper face portion interconnecting upper end portions of the front and rear face portions of the connection member, at least one of said front and rear face portions of the connection member has an opening portion formed at the side-sill-side connection portion, said outside end portion of the cross member is located on the outside of said opening portion, and an actuator of a seatbelt device to protect a passenger seated in a seat for passenger is provided inside the connection member through said opening portion.

2. A vehicle-body lower structure of a vehicle, comprising:
a tunnel portion provided at a central portion, in a vehicle width direction, of a floor panel forming a bottom face of a vehicle compartment;
a cross member provided between the tunnel portion and a connection portion of a center pillar to a side sill provided at a side portion of the vehicle compartment to extend in the vehicle width direction; and
a connection member connecting an outside portion of the cross member and an inside wall face portion of the side sill,
wherein said connection member includes a cross-member-side connection portion connected to said cross member and a side-sill-side connection portion connected to said side sill, said side-sill-side connection portion is configured to have a lower rigidity than said cross-member-side connection portion, and an outside end portion of said cross member is located at a specified position which is located on the outside of the cross-member-side connection portion and on the inside away from the inside wall face portion of the side sill, an upper face of the side sill is located above a level of an upper face of said cross member, and the side-sill-side connection portion of said connection member is located above a level of the cross-member-side connection portion, said connection member is formed in a boxy shape having front and rear face portions connected respectively to front and rear face portions of said cross member and an upper face portion interconnecting upper end portions of the front and rear face portions of the connection member, at least one of said front and rear face portions of the connection member has an opening portion formed at the side-sill-side connection portion, said outside end portion of the cross member is located on the outside of said opening portion, and an actuator of a seatbelt device to protect a passenger seated in a seat for passenger is provided inside the connection member through said opening portion, and said cross member is arranged such that the outside end portion thereof faces the inside wall face portion of the side sill with a specified distance therebetween, and includes a cross member body extending in the vehicle width direction and a reinforcement member placed onto an outside portion of the cross member body, and said connection member is placed onto an overlap portion of the cross member body and the reinforcement member.

3. A vehicle-body lower structure of a vehicle, comprising:
a tunnel portion provided at a central portion, in a vehicle width direction, of a floor panel forming a bottom face of a vehicle compartment;
a cross member provided between the tunnel portion and a connection portion of a center pillar to a side sill provided at a side portion of the vehicle compartment to extend in the vehicle width direction; and
a connection member connecting an outside portion of the cross member and an inside wall face portion of the side sill, wherein said connection member includes a cross-member-side connection portion connected to said cross member and a side-sill-side connection portion connected to said side sill, said side-sill-side connection portion is configured to have a lower rigidity than said cross-member-side connection portion, and an outside end portion of said cross member is located at a specified position which is located on the outside of the cross-member-side connection portion and on the inside away from the inside wall face portion of the side sill, an upper face of the side sill is located above a level of an upper face of said cross member, and the side-sill-side connection portion of said connection member is located above a level of the cross-member-side connection portion, said connection member is formed in a boxy shape having front and rear face portions connected respectively to front and rear face portions of said cross member and an upper face portion interconnecting upper end portions of the front and rear face portions of the connection member, at least one of said front and rear face portions of the connection member has an opening portion formed at the side-sill-side connection portion, said outside end portion of the cross member is located on the outside of said opening portion, and an actuator of a seatbelt device to protect a passenger seated in a seat for passenger is provided inside the connection member through said opening portion, and said cross member includes an outside member which is connected to the side sill at an inside end portion thereof via said connection member and an inside member which is provided on the inside of the outside member, and said outside member of the cross member has a higher rigidity than said inside member.

* * * * *